(12) United States Patent
Storc et al.

(10) Patent No.: US 8,739,907 B2
(45) Date of Patent: Jun. 3, 2014

(54) VEHICLE WITH STRUCTURAL BATTERY PACK

(75) Inventors: Robert Gordon Storc, Rochester Hills, MI (US); James Edward Robertson, Rochester, MI (US); Bhavin Narshi Mandalia, Markham (CA); Zsolt Almasi, Toronto (CA); Jean-Yves St. Gelais, Stouffville (CA); Grzegorz Kardasz, Richmond Hill (CA); Barbara Kardasz, legal representative, Richmond Hill (CA); Floyd Thomas Elder, Markham (CA)

(73) Assignee: Magna E-Car Systems Limited Partnership, Aurora (CA)

( * ) Notice: Subject to any disclaimer, the term of this patent is extended or adjusted under 35 U.S.C. 154(b) by 215 days.

(21) Appl. No.: 13/268,197

(22) Filed: Oct. 7, 2011

(65) Prior Publication Data

US 2012/0090907 A1 Apr. 19, 2012

Related U.S. Application Data

(60) Provisional application No. 61/507,461, filed on Jul. 13, 2011, provisional application No. 61/393,133, filed on Oct. 14, 2010.

(51) Int. Cl.
*B60R 16/04* (2006.01)
(52) U.S. Cl.
USPC ...................................... 180/68.5; 180/65.29

(58) Field of Classification Search
USPC .............................................. 180/68.5, 65.29
See application file for complete search history.

(56) References Cited

U.S. PATENT DOCUMENTS

| | | | | |
|---|---|---|---|---|
| 4,365,681 A * | 12/1982 | Singh | ........................... | 180/68.5 |
| 5,378,555 A * | 1/1995 | Waters et al. | ................... | 429/97 |
| 5,390,754 A * | 2/1995 | Masuyama et al. | .......... | 180/68.5 |
| 6,085,854 A * | 7/2000 | Nishikawa | .................... | 180/68.5 |
| 6,188,574 B1 * | 2/2001 | Anazawa | ...................... | 361/695 |
| 6,227,322 B1 * | 5/2001 | Nishikawa | .................... | 180/68.5 |
| 6,315,069 B1 * | 11/2001 | Suba et al. | .................... | 180/68.5 |
| 6,402,229 B1 * | 6/2002 | Suganuma | ............... | 296/203.02 |
| 6,648,085 B2 * | 11/2003 | Nagura et al. | ............... | 180/65.1 |
| 7,610,978 B2 * | 11/2009 | Takasaki et al. | ............. | 180/68.5 |
| 7,997,368 B2 * | 8/2011 | Takasaki et al. | ............. | 180/68.5 |
| 8,276,697 B2 * | 10/2012 | Takasaki | ...................... | 180/68.5 |
| 8,413,751 B2 * | 4/2013 | Jufuku et al. | ................ | 180/68.5 |
| 8,464,817 B2 * | 6/2013 | Usami et al. | ................. | 180/68.5 |
| 8,556,017 B2 * | 10/2013 | Kubota et al. | ................ | 180/68.5 |
| 8,561,743 B2 * | 10/2013 | Iwasa et al. | .................. | 180/68.5 |
| 2009/0011050 A1 | 1/2009 | Simmons | | |
| 2012/0055724 A1 * | 3/2012 | Iwasa et al. | .................. | 180/68.5 |
| 2012/0055725 A1 * | 3/2012 | Mizoguchi et al. | .......... | 180/68.5 |
| 2012/0090907 A1 * | 4/2012 | Storc et al. | ................... | 180/68.5 |
| 2012/0097466 A1 * | 4/2012 | Usami et al. | ................. | 180/68.5 |
| 2012/0160584 A1 * | 6/2012 | Nitawaki | ...................... | 180/68.5 |
| 2013/0248267 A1 * | 9/2013 | Nitawaki | ...................... | 180/68.5 |
| 2013/0248268 A1 * | 9/2013 | Matsuda et al. | ............. | 180/68.5 |

* cited by examiner

*Primary Examiner* — Jeffrey J Restifo
(74) *Attorney, Agent, or Firm* — Dickinson Wright, PLLC

(57) ABSTRACT

In an aspect, the invention is directed to a vehicle chassis for a vehicle that is at least partly driven by an electric motor, wherein the vehicle chassis incorporates a battery pack that acts as a structural member of the chassis.

18 Claims, 10 Drawing Sheets

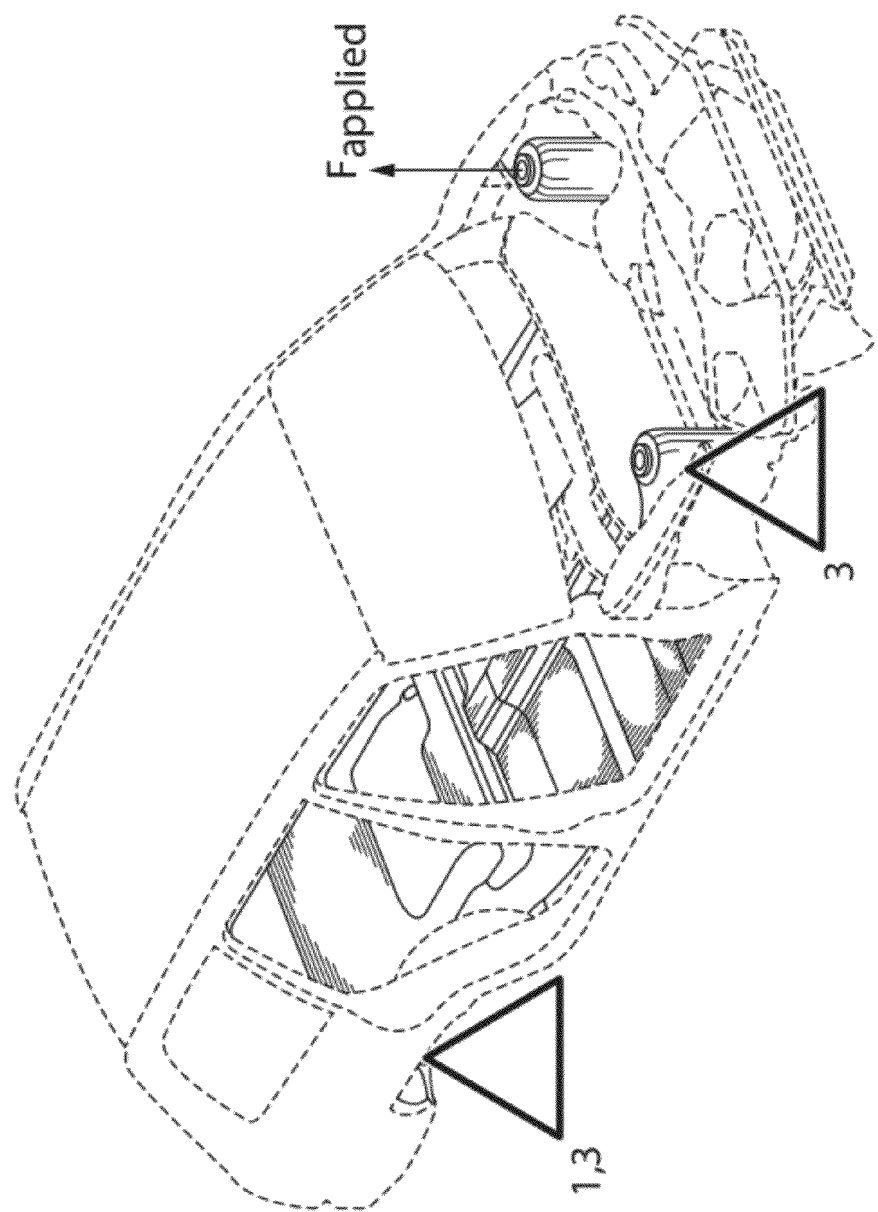

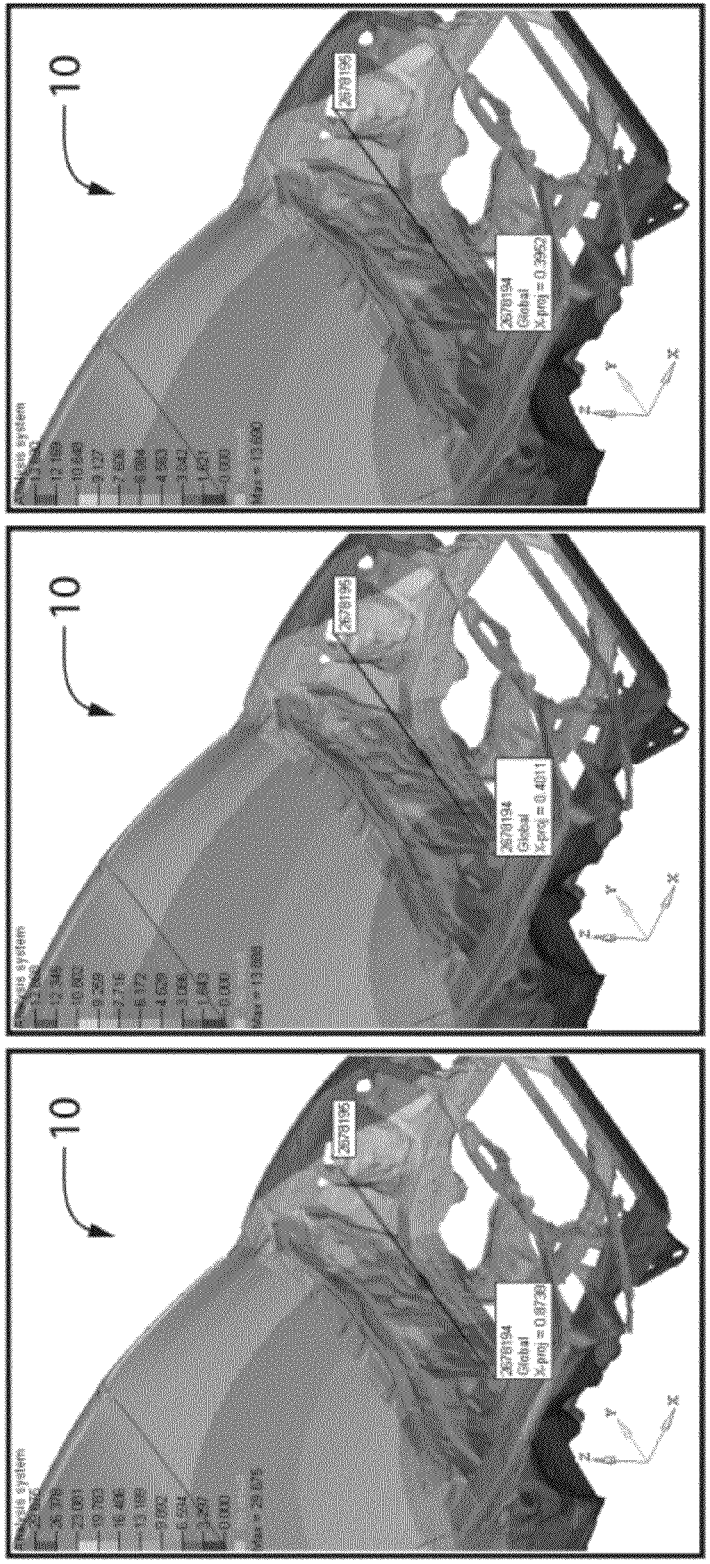
FIG.6b BASELINE
FIG.6c PACK MOUNTED AT 12 FRAME LOCATIONS AND 2 END SHEAR PANEL LOCATIONS
FIG.6D PACK MOUNTED AT ADDITIONAL TOP COVER LOCATIONS

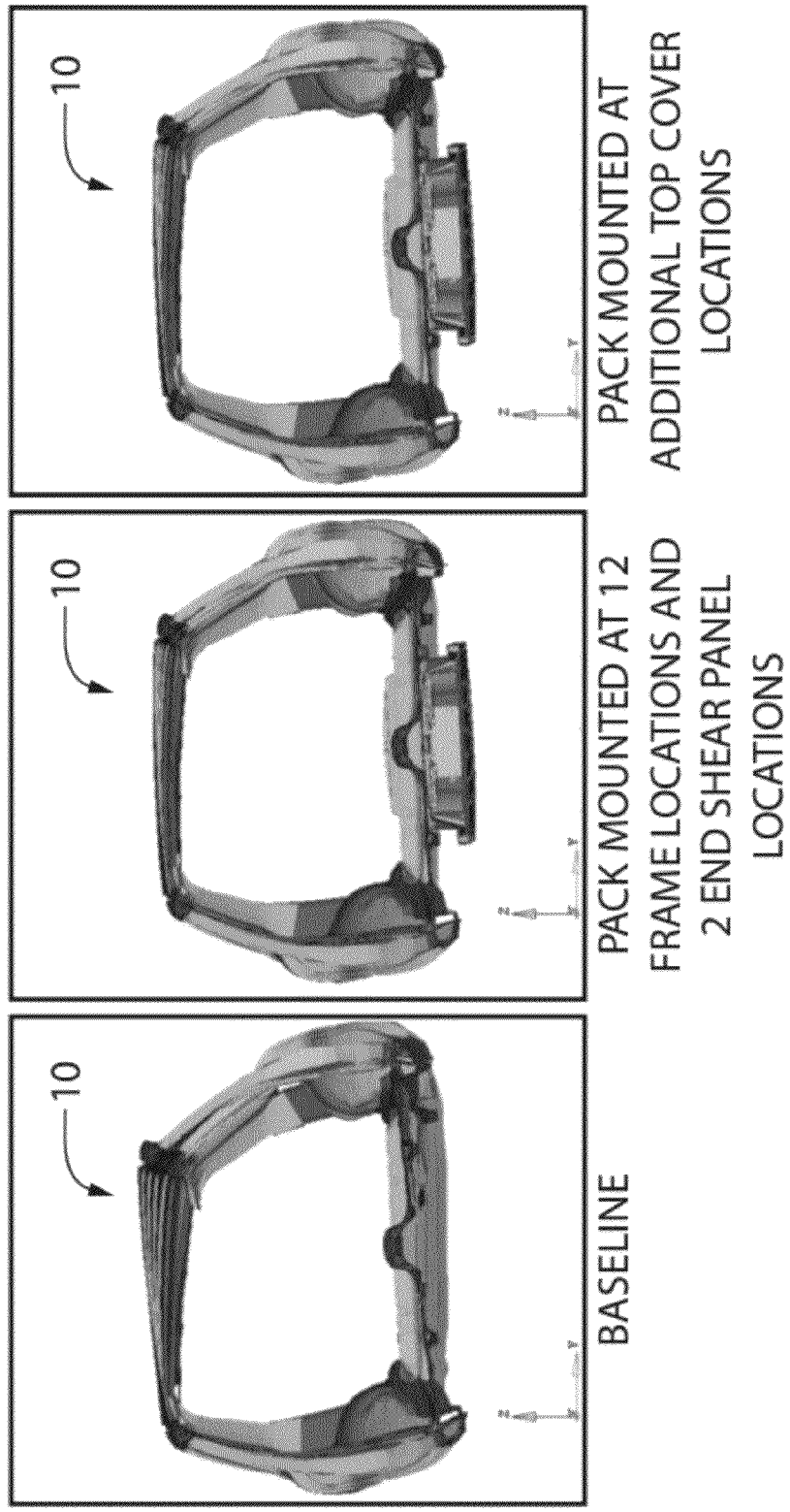

VEHICLE WITH STRUCTURAL BATTERY PACK

CROSS-REFERENCE TO RELATED APPLICATIONS

This application claims priority to and the benefit of U.S. Provisional Application No. 61/393,133 filed Oct. 14, 2010 and U.S. Provisional Application No. 61/507,461 filed Jul. 13, 2011. The above applications are each incorporated herein by reference in their entirety.

FIELD OF THE INVENTION

The present invention relates to vehicles with electric traction motors and more particularly to the chassis of such vehicles.

BACKGROUND OF THE INVENTION

Some vehicles today are driven at least in part by one or more electric motors. These vehicles include one or more battery packs for the purpose of supplying power to the one or more electric motors. In an effort to increase the range of the vehicle the battery pack can be quite large and quite heavy, which negatively impacts the range of the vehicle. Range is particularly important with such vehicles in order for them to grow in acceptance in the marketplace.

It would be advantageous to increase the range of such vehicles.

SUMMARY OF THE INVENTION

In a first aspect, the invention is directed to a combination of a vehicle chassis and a battery pack for a vehicle that is at least partly driven by an electric motor. The battery pack acts as a structural member that cooperates with the chassis to resist one or more of torsional forces, laterally inwardly directed forces, and downwardly directed bending forces. In an embodiment, the chassis includes first and second rails that are laterally spaced apart, and the battery pack is generally rectangular and has lateral side faces that are positioned proximate the inboard sides of the rails to reinforce the rails against laterally inwardly directed forces, such as side impacts.

More specifically, the vehicle chassis may include a first rail and a second rail each extending longitudinally, each being spaced apart laterally from the other, and each having an inboard side and an outboard side. The vehicle chassis may further include a battery pack, including a plurality of cells supported by a housing. The battery pack is generally rectangular and is mounted to the rails and has a first lateral side and a second lateral side which support the inboard sides of the first and second rails against laterally inwardly directed forces.

In another embodiment, the chassis includes first and second rails that are laterally spaced apart, and the battery pack is mounted to the bottom of each of the first and second rails at a plurality of lower points that are longitudinally spaced apart including a first point proximate a forward cross-member and a second point proximate a rearward cross-member.

More specifically, the vehicle chassis may include a first rail and a second rail which extend longitudinally and are spaced apart laterally from each other and each of which has an inboard side and an outboard side. The vehicle chassis may include a forward cross-member and a rearward cross-member, and a battery pack having a plurality of cells supported by a housing. Each of the first and second rails has a bottom and the battery pack is mounted to the bottom of each of the first and second rails at a plurality of lower points that are longitudinally spaced apart including a first point proximate the forward cross-member and a second point proximate rearward cross-member.

BRIEF DESCRIPTION OF THE DRAWINGS

The present invention will now be described by way of example only with reference to the attached drawings, in which:

FIG. 6a is a perspective view of a test model used for testing the vehicle as shown in FIG. 2, illustrating the determination of the vehicle's projected path;

FIGS. 6b, 6c and 6d are perspective views of the test model shown in FIG. 6a, illustrating the angular deflections incurred by the vehicle without the battery pack, with the battery pack mounted to the bottoms of the rails, and with the battery pack mounted to both the bottoms of the rails and to the floorpan respectively;

FIGS. 7a, 7b and 7c are sectional end views of the test model shown in FIG. 6a, illustrating the angular deflections incurred by the vehicle without the battery pack, with the battery pack mounted to the bottoms of the rails, and with the battery pack mounted to both the bottoms of the rails and to the floorpan, respectively;

DETAILED DESCRIPTION OF THE INVENTION

Figure 1:
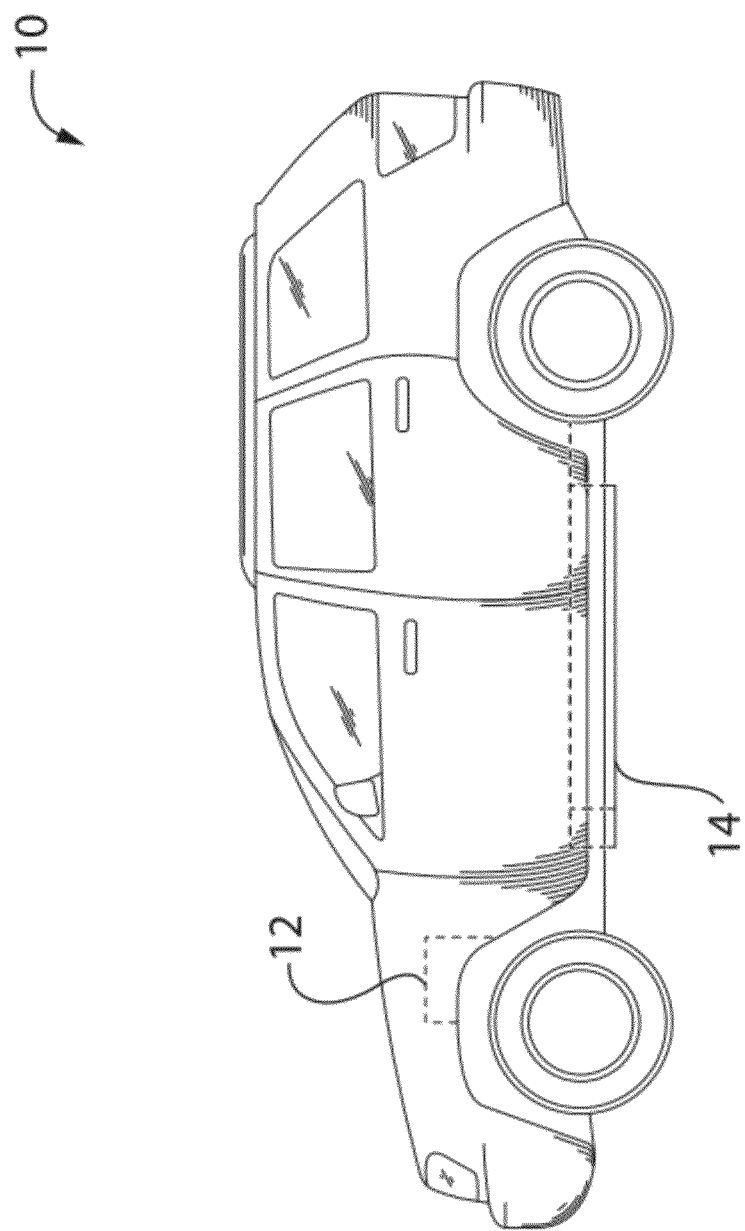
FIG. 1 is a side elevation view of a vehicle with an electric motor, a chassis and a battery pack that forms a structural member in accordance with an embodiment of the present invention.

Reference is made to FIG. 1, which shows a vehicle 10 that is at least partially driven by an electric traction motor 12. The vehicle may be driven solely by the electric motor 12, or it may be driven partly by the electric motor 12 and partly by an internal combustion engine (not shown). Alternatively an internal combustion engine may be provided (although not shown in the figures) for the purpose of generating electricity with which to drive the electric motor 12. The vehicle 10 includes, among other things, a vehicle chassis 11 (FIG. 2), the electric traction motor 12 and a battery pack 14. The vehicle 10 as shown does not include a gasoline engine, however in alternative embodiments it could. The traction motor 12 may be a centrally positioned traction motor, as shown in FIG. 1, or alternatively it may be one of a plurality of traction motors (e.g. wheel hub motors).

Figure 2:
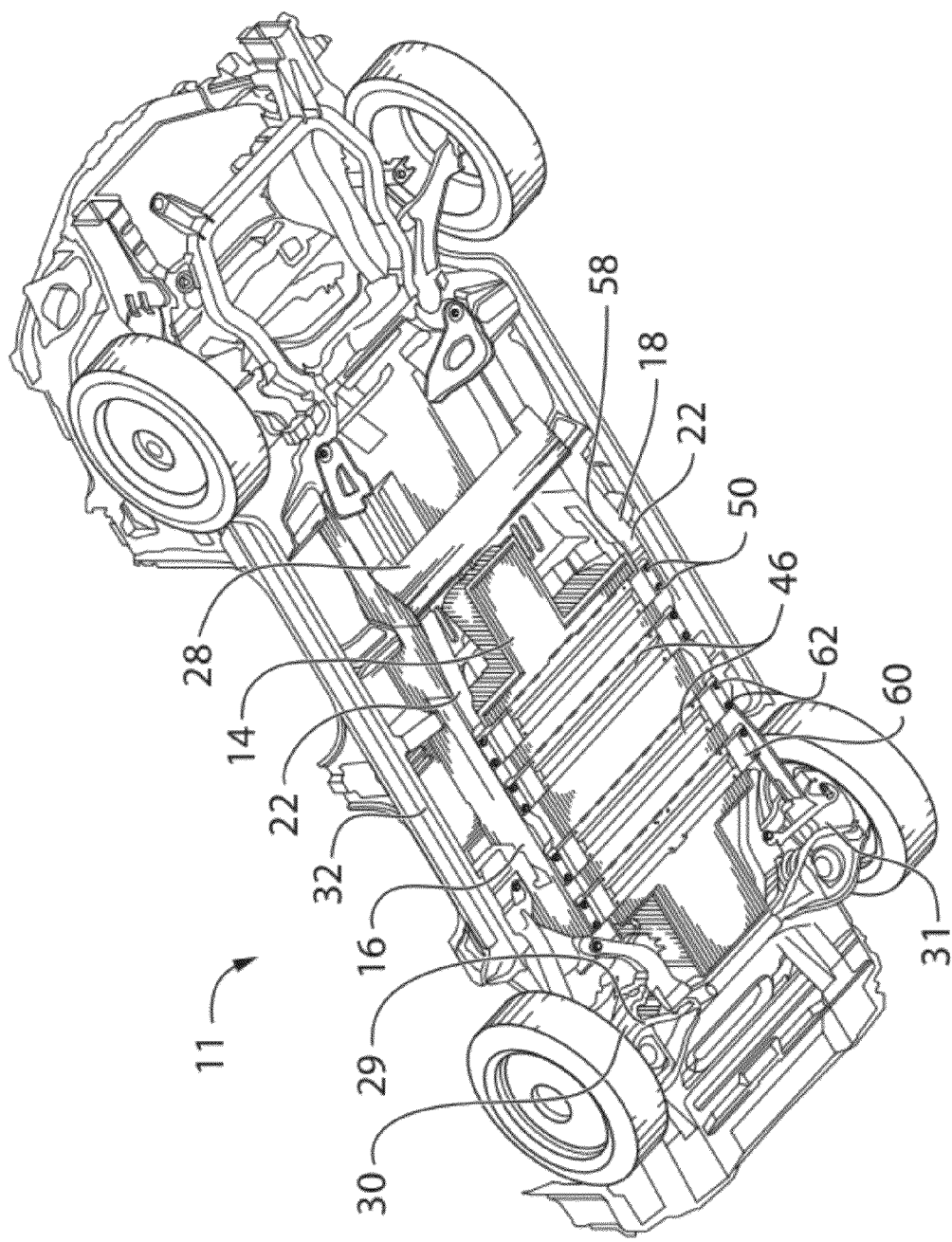
FIG. 2 is a perspective view from underneath the vehicle shown in FIG. 1 showing the mounting of the battery pack.
Figure 3:
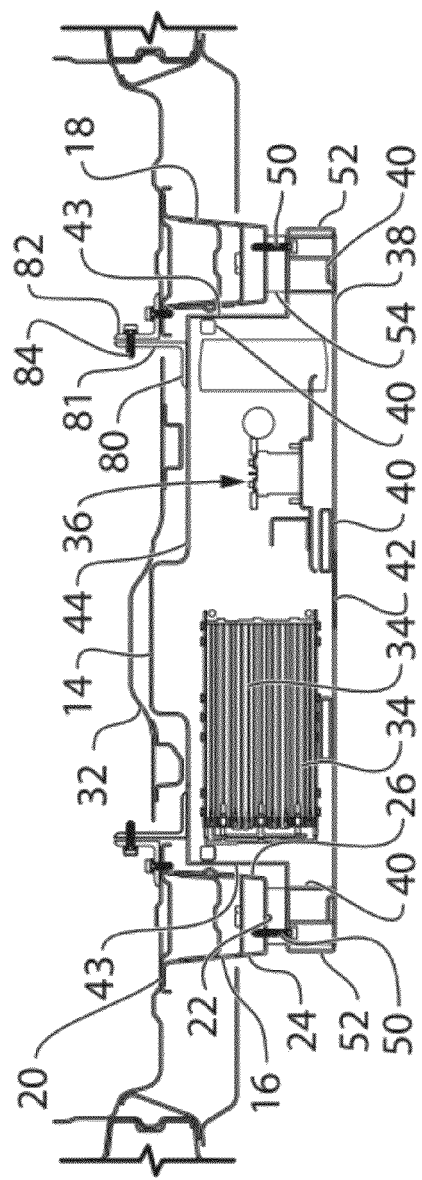
FIG. 3 is a sectional end view of a front portion of the battery pack shown mounted to the vehicle chassis in a different way than the mounting shown in FIG. 2

Referring to FIG. 2, the vehicle chassis 11 includes, among other things, a first rail 16, a second rail 18 and a floorpan 32. The first and second rails 16 and 18 extend longitudinally and are spaced apart laterally from each other. As shown in FIG. 3, the first and second rails 16 and 18 each have a top 20 (which is mounted directly to the floorpan 32), a bottom 22, an outboard side 24 and an inboard side 26. Referring to FIG. 2, forward and rearward cross-members 28 and 29 extend laterally and provide lateral crush resistance to the chassis 11 and are both in the area of the passenger cell (i.e. the portion of the vehicle that contains the driver and passengers). In the embodiment shown, the forward cross-member 28 connects the first and second rails 16 and 18. The rearward cross-member 29 is, in the embodiment shown, made up of the rear axles shown at 30 and 31, and their support structure.

The battery pack 14 is connected to the chassis 11 in such a way as to increase the strength of the chassis 11. The strength of the chassis 11 may be determined by one or more parameters, such as, for example, torsional stiffness, or for example, bending stiffness, or for example, lateral resistance to side impacts in the area of the passenger cell. In the embodiment shown in FIG. 2, the battery pack 14 increases all three of those parameters. Referring to FIG. 3, the battery pack 14 is made up of a plurality of cells 34, a control system 36 and a housing 38. The housing 38 may include structural members 40, a lower housing member 42 and an upper housing member 44. The structural members 40 are used to stiffen the battery pack 14, due to the relatively high weight associated with the cells 34 contained therein. The structural members 40 may include, for example, 2"×3" rectangular tubes, which extend about the lower periphery of the lower housing member 42, in addition to a plurality of 1" square tubes and other smaller tubes that extend about the periphery of one or both of the lower and upper housing members 42 and 44. The structural members 40 may be made from any suitable material, such as carbon steel.

The lower and upper housing members 42 and 44 may themselves be structural and may thus cooperate with the structural members 40 to support the cells 34. The lower and upper housing members 42 and 44 may have any suitable construction. For example, they may be made from panels made from a sandwich of inner and outer epoxy layers with a balsa layer therebetween. The structural members 40 may be connected to the upper and lower housing members 44 and 42 in any suitable way, such as by mechanical fasteners. Furthermore, the lower and upper housing members 42 and 44 may be connected to each other by any suitable means, such as by mechanical fasteners. The structural members 40 and the housing members 42 and 44 are selected at least in part to support the weight of the cells 34, which can be relatively heavy depending on the number of cells 34 contained therein. Thus, the housing 38 may be relatively strong.

The battery pack 14, or more specifically the battery pack housing 38, may have any suitable shape. For example, the battery pack housing 38 may have a rectangular section that has lateral sides faces 41 and 43 that are proximate to the inboard sides 26 of the first and second rails 16 and 18 along substantially the entire length of the battery pack, which is preferably also along substantially the entire length of the first and second rails 16 and 18 between the forward and rearward cross-members 28 and 29. As a result of the strength of the housing 38, the housing 38 serves to reinforce the first and second rails 16 and 18 against side impacts on the vehicle 10 and against other types of impact that would cause buckling of the side rails in the inboard direction.

The battery pack 14, or more specifically the battery pack housing 38, may connect to the vehicle chassis 11 in any suitable way. For example, as shown in FIG. 2, the bottom of the battery pack housing 38 may a plurality of lateral braces 46 welded (or otherwise connected) thereto. The lateral braces 46 extend to the bottoms 22 of the rails 16 and 18. Bolts or other mechanical fasteners 50 pass through the braces 46 and into the bottoms 22 of the rails 16 and 18.

In an alternative embodiment shown in FIG. 3, the housing 38 itself includes lateral extensions 52 which pass under the first and second rails 16 and 18. Structural members 40 (e.g. 2"×3" steel beams) run along the lateral extensions 52. Mechanical fasteners 50 pass through the structural members 40, through spacers shown at 54, and finally into a rail 16 or 18.

There may be provided any suitable number of fasteners 50 joining the battery pack housing 38 to the rails 16 and 18. For example, in the embodiment shown in FIG. 2, eight fasteners 50 may be used for connecting the battery pack housing 38 to each rail 16 and 18, at eight longitudinally spaced apart points along each of the rails 16 and 18, including a first point 58 proximate the forward cross-member 28, a second point 60 proximate the rearward cross-member 29, and at six other points 62 that may have any suitable spacing between the first and second points 58 and 60. In the embodiment shown the eight points are arranged in four pairs that are generally equidistant from each other.

Figure 4:
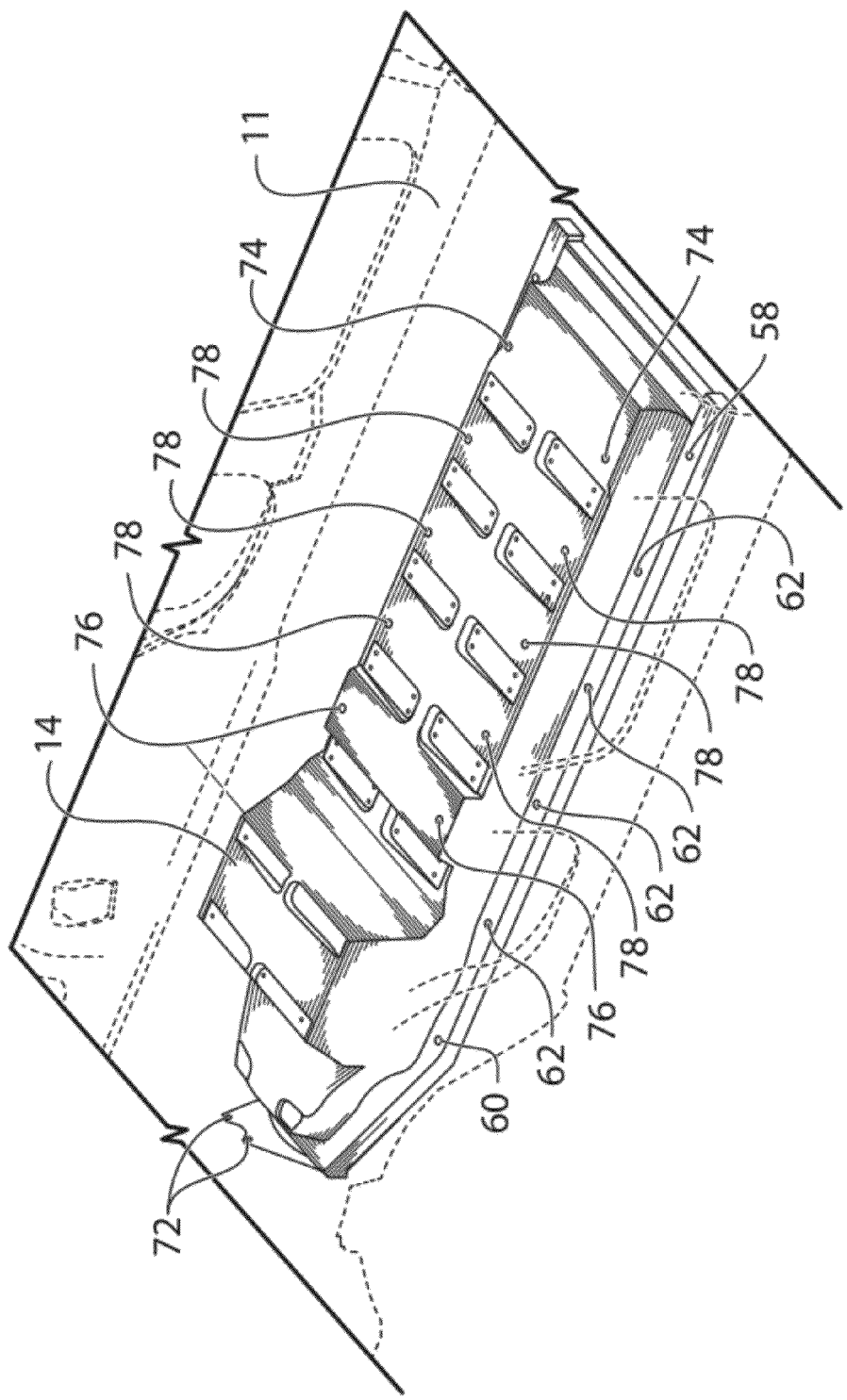
FIG. 4 is a perspective view of the vehicle chassis, showing the battery pack mounting shown in FIG. 3.

In the embodiment shown in FIG. 4, the battery pack housing 38 is connected at six longitudinally spaced apart points to the bottom of each of the first and second rails 16 and 18, including first point 58 proximate the forward cross-member 28, second point proximate the rearward cross-member 29 and four additional points 62 between the first and second points. In the embodiment shown in FIG. 4, the six points are generally equidistant from each other, however, they may have any suitable spacing.

Figure 5:
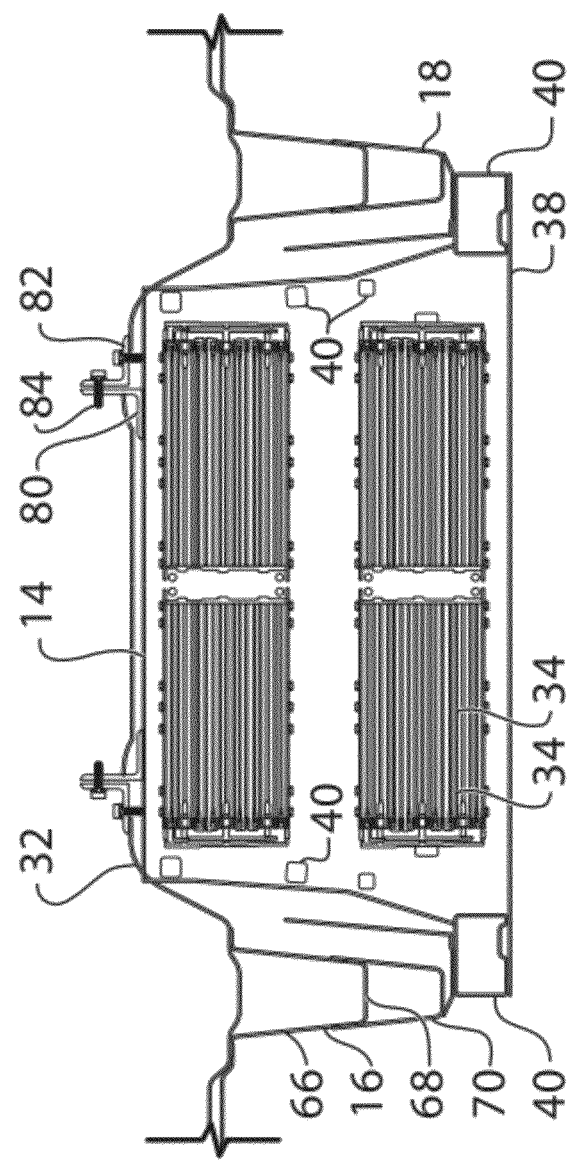
FIG. 5 is a sectional end view of a rear portion of the battery pack shown mounted to the vehicle chassis in a different way than the mounting shown in FIG. 2.

FIG. 3 shows the mounting of the battery pack 14 to the rails 16 and 18 proximate the front end of the battery pack 14. FIG. 5 shows the mounting of the battery pack 14 proximate the rear end of the battery pack 14. As shown in FIG. 5, the battery pack 14 is higher to take advantage of the space in the vehicle 10 where the fuel tank would normally sit if the vehicle were to have an internal combustion engine.

In embodiments wherein the vehicle 10 was originally designed for use with an internal combustion engine, each of the rails 16 and 18 may be made up of an OEM rail element 66 and a rail extension 70. The OEM rail element is the original rail of the vehicle 11 chassis, as originally intended when the vehicle 10 is configured with an internal combustion engine. The bottom of the OEM rail element 66 is shown at 68 and is at a height which may not be suitable for mounting the battery pack 14 thereto. In order to permit the battery pack housing 38 to mount to the OEM rail element 66, each OEM rail element 66 is provided with the rail extension 70, which effectively lowers the bottom 68 of the OEM rail element 66 to a suitable place for connecting to the associated lateral extension 52 of the battery pack housing 38.

In addition to mounting the battery pack housing 38 at the bottom of each rail 16, 18, it is possible to also mount the battery pack housing 38 at one or more (in this case, two) points 72 (FIG. 4) at the rear end of the battery pack housing 38. In the embodiment shown, the two points are on the floorpan 32. Optionally, the front end of the battery pack housing 38 may be connected to the vehicle chassis 11 at one or more points (not shown in FIG. 4).

As shown in FIGS. 3-5, it is optionally possible to also connect the top of the battery pack 14 to the vehicle chassis 11. As shown in FIG. 4, the top of the battery pack housing 38 may be connected to the floorpan 32 and to the top of each rail 16 and 18 at five longitudinally spaced apart points including a first point 74 proximate the forward cross-member 28, a second point 76 proximate the rearward cross-member 29 and three additional points 78 between the first and second points 74 and 76.

Figure 3A:
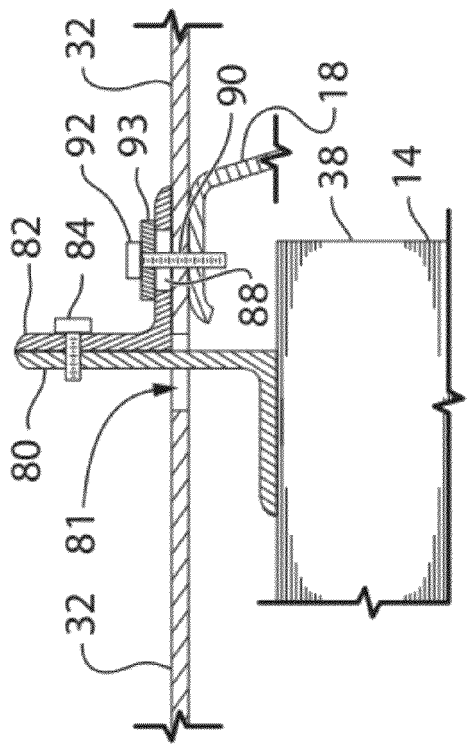
FIG. 3a is an enlarged partial view of components shown in FIG. 3.

The top of the battery pack 14 may mount to the chassis 11 in any suitable way. Referring to FIGS. 3 and 3a, a first bracket 80 may be mounted to each side of the top of the battery pack housing 38 and may extend through an aperture 81 in the floorpan 32. A second bracket 82 may be fixedly mounted to the first bracket 80 via fasteners 84 (only one is shown on each second bracket 82 in FIG. 3). At each point 74, 76 and 78 an aperture 88 (best shown in FIG. 3a) is provided in the second bracket 82 and is generally aligned with an aperture 90 in the floorpan 32 and upper flange of the rail 16, 18. The apertures 88 and 90 together form a pair of generally aligned apertures which receive a fastener 92 therethrough. At least one of the apertures 88 or 90 is enlarged relative to the body of the fastener 92 so as to permit some play in the position of the second bracket 82, while still permitting the pass-through of the fastener 92. When the battery pack 14 is mounted to the bottoms of the rails 16 and 18, the apertures 88 and 90 are sufficiently aligned so that the fastener 92 can be passed through them and tightened so as to fix the upper portion of the battery pack 14 to the floorpan 32 and upper flange of the rail 16, 18. As a result of one or both of the aperture 88 and 90 being enlarged, some tolerance can exist in the longitudinal and lateral directions in the relative positions of the apertures 88 and the apertures 90 (i.e. in the relative positions of the battery pack 14 and the chassis 11 (specifically the floorpan 32)) while still permitting the top of the battery pack 14 to mount to the chassis 11 without inducing stresses in one or the other. In the embodiment shown, the aperture 88 is the enlarged aperture. A plate washer shown at 93 is provided between the head of the fastener 92 and the aperture 88.

By providing the mounting of the battery pack 14 at lower points (i.e. points 58, 60 and 62) and at upper points (i.e. points 74, 76 and 78) which are spaced vertically from the lower points, the increase in torsional resistance provided by the battery pack 14 is increased further, as compared to only connecting the battery pack 14 at the lower points.

Figure 8:
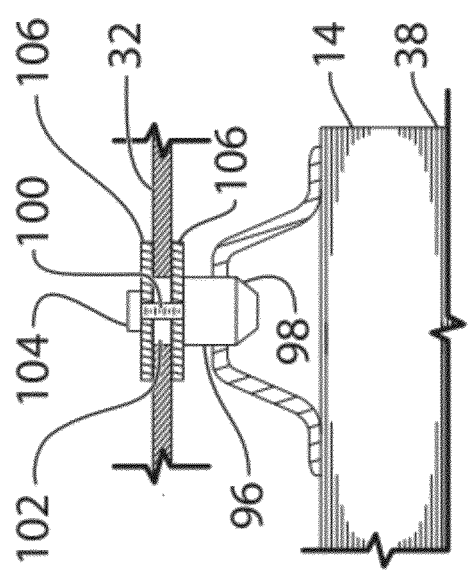
FIG. 8 is a sectional end view of a front portion of the battery pack shown mounted to the vehicle chassis in a different way than the mounting shown in FIG. 3.

Reference is made to FIG. 8, which shows an alternative mounting of the top of the battery pack housing 38 to the floorpan 32, which permits tolerance in the longitudinal, lateral and vertical directions between the relative positions of the battery pack 14 and the chassis 11 (specifically the floorpan 32) while still permitting the top of the battery pack 14 to mount to the chassis 11 without inducing stresses in one or the other and without the need for shims. In the embodiment shown, at each point 74, 76 and 78, the top of the battery pack housing 38 has a bracket 94 fixedly mounted thereon, having a locating aperture 96. The locating aperture 96 is sized to snugly receive a locating pin 98. A fastener 100 (in this case a threaded rod) passes from locating pin 98, through an enlarged aperture 102 in the floorpan 32 and extends into a threaded aperture of a nut 104. When the battery pack 14 is mounted to the bottoms of the rails 16 and 18, the fastener 100 is sufficiently aligned with the enlarged aperture 102 so that the fastener 100 can pass through it and can screw sufficiently into the nut 104 so that together the locating pin 98 and the nut 104 can clamp the floorpan 32 (using a pair of plate washers 106), thereby fixing the position of the locating pin 98 relative to the floorpan 32. As a result of the aperture 102 being enlarged, some tolerance can exist in the longitudinal and lateral directions in the relative positions of the battery pack 14 and the chassis 11 (specifically the floorpan 32)) while still permitting the top of the battery pack 14 to mount to the chassis 11 without inducing stresses in one or the other. The locating pin 98 is not fixed in position vertically with respect to the locating aperture 96 and as a result, some vertical tolerance can exist between the relative positions of the battery pack 14 and the chassis 11 (specifically the floorpan 32).

Tests were conducted using finite element analysis, with an arrangement as shown in FIG. 6a, to determine the relative torsional stiffness of the vehicle 10 with and without the battery pack 14 installed. As can be seen in FIG. 6a, a force F is applied at the mounting point of the shock absorber for the front driver's side wheel, while the equivalent points for the other three wheels are held fixed. The results of this test are shown in FIG. 6b for the vehicle 10 without the battery pack 14, and in FIG. 6c for the vehicle 10 with the battery pack 14 installed and mounted to the vehicle chassis 11. In the test on the vehicle 10 without the battery pack 14, (FIG. 6a) the maximum displacement on the vehicle 10 was 29.675 mm. In the vehicle 10 with the battery pack 14 mounted to the bottoms 22 of the rails 16 and 18 at 12 points and to the floorpan 32 at 2 points (at the rear end of the battery pack 14), the maximum displacement is shown in FIG. 6b and was 13.888 mm. Thus, the improvement in torsional stiffness by the addition of the battery pack 14 is approximately 118%. This increase in torsional stiffness can be used in several ways. The vehicle 10 can be designed with relatively lighter rails 16 and 18 (and possibly other lighter chassis elements) since its stiffness with the battery pack 14 installed can be within acceptable limits. These lighter elements at least partially offset the additional weight that the battery pack 14 burdens the vehicle 10 with. FIG. 6d shows the vehicle 10 when the lower part of the battery pack 14 is mounted at 12 points to the bottoms 22 of the rails 16 and 18 and to the two points on the floorpan 32 at the rear end of the battery pack 14, and wherein the top of the battery pack 14 is mounted to the 10 points along the floorpan 32, as shown in FIG. 4. As can be seen, the maximum angular displacement is 13.690 mm. This corresponds to another 3% reduction in angular displacement. Thus, with the mounting as shown in FIG. 4, there is an increase of 121% in torsional stiffness relative to the vehicle without the battery pack 14.

FIG. 7a shows a sectional view of the vehicle 10 illustrating the body twist incurred by the vehicle 10 undergoing the test modeled in FIG. 6a, without the battery pack 14. FIG. 7b shows the vehicle 10 with the lower part of the battery pack 14 mounted at the 12 points to the bottoms of the rails 16 and 18 and at the two points to the floorpan 32. FIG. 7c shows the body twist incurred when the lower part of the battery pack 14 is mounted at the 14 aforementioned points and when the top of the battery pack 14 is mounted at the 10 additional points on the floorpan 32. The amount of body twist incurred by the vehicle 10 shown in FIGS. 7a, 7b and 7c has been exaggerated to better illustrate the effect of providing the battery pack 14 on the vehicle 10. As can be seen, the vehicle 10 incurs a greater amount of body twist without the battery pack 14.

Figure 9:
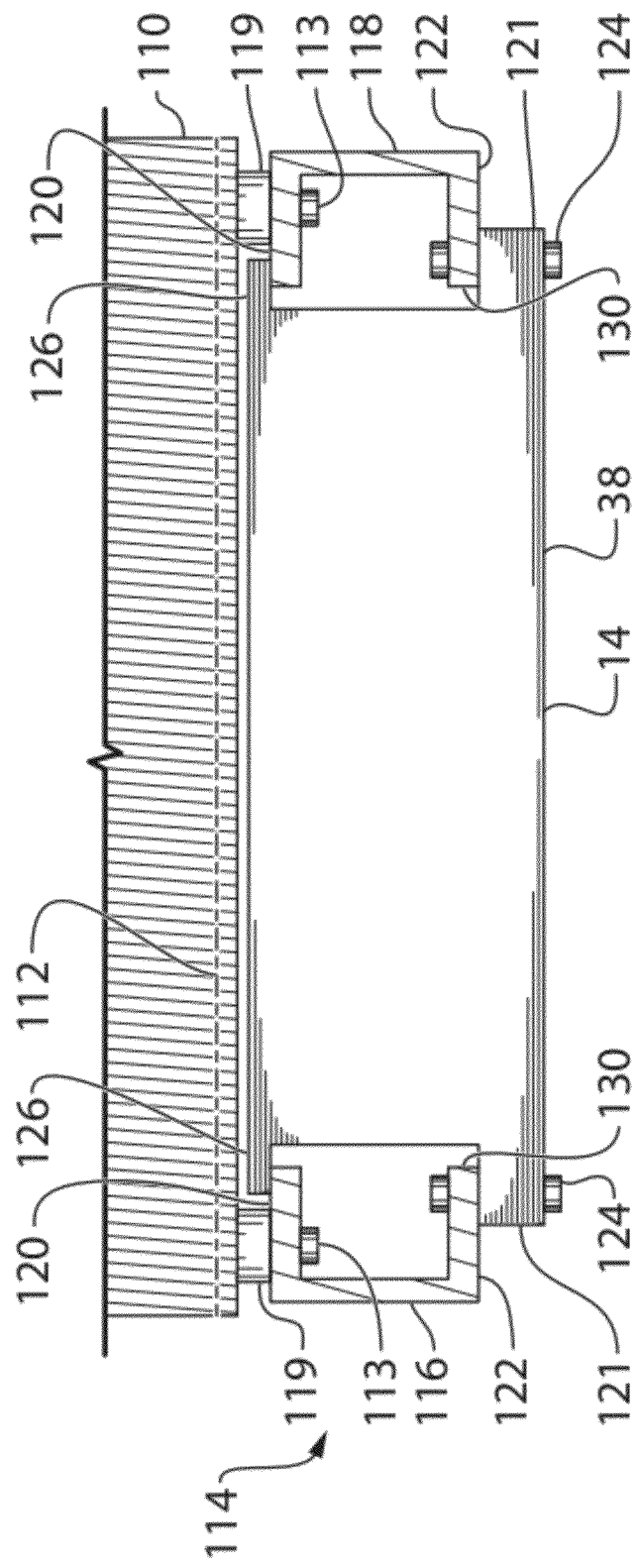
FIG. 9 is a sectional end view of a front portion of the battery pack shown mounted to a vehicle chassis in a different way than the mounting shown in FIG. 2.

Reference is made to FIG. 9, which shows the battery pack 14 with a modified housing 38, for use with a vehicle having a body-on-frame design instead of a unibody design. The vehicle shown in FIG. 9 has a body 110 that includes a floorpan 112 and that is mounted via fasteners 113 to a chassis 114. The chassis includes rails 116 and 118. Isolation mounts 119 are provided between the rails 116 and 118 and the body 110. The rails 116 and 118 are shown in FIG. 9 as channels, however, they could have any suitable shape, such as a closed box-section shape. The battery pack housing 38 may have lower lateral extensions 121 similar to those shown in FIGS. 3 and 8, which mount to the bottoms shown at 122 of the rails 116 and 118 via fasteners 124 (e.g. bolts). The top of the battery pack housing 38 may have upper lateral extensions 126 which extend over and mount to the tops shown at 120 of the rails 116 and 118. The upper extensions 126 may further be mounted to the tops of the rails 16 and 18 via additional fasteners (not shown).

The battery pack 14 may be mounted at any suitable number of points and may be mounted proximate a forward cross-member (not shown) and proximate a rearward cross-member (not shown), and may have a shape that extends laterally up to the inboard edges shown at 130 of the rails 116 and 118 along substantially their lengths between the aforementioned forward and rearward cross-members. Thus the battery pack 14 can provide similar advantages in torsional stiffness, side impact resistance, and bending resistance to a vehicle with a body on frame design as it does for a vehicle with a unibody design.

While the above description constitutes a plurality of embodiments of the present invention, it will be appreciated that the present invention is susceptible to further modification and change without departing from the fair meaning of the accompanying claims.

The invention claimed is:

1. A combination of a vehicle chassis and a battery pack for a vehicle that is at least partly driven by an electric motor, the combination comprising:
    a vehicle chassis including a floor pan, a first rail and a second rail, wherein the first and second rails extend longitudinally and are spaced apart laterally from each other, wherein each of the rails has a bottom, an inboard side and an outboard side; and
    a battery pack, including a plurality of cells supported by a housing, wherein the battery pack is generally rectangular and is mounted to the bottom of each of the first and second rails at a plurality of lower points that are longitudinally spaced apart, wherein the battery pack has a first lateral side and a second lateral side which support the inboard sides of the first and second rails against laterally inwardly directed forces, and wherein the battery pack has a top that is mounted to the floorpan at a plurality of upper points that are longitudinally spaced apart.

2. A combination as claimed in claim 1, further comprising a forward cross-member and a rearward cross-member, and the first and second sides of the battery pack support the inboard sides of the first and second rails along substantially the entire length of the first and second rails between the forward and rearward cross-members against laterally inwardly directed forces.

3. A combination as claimed in claim 1, further comprising a forward cross-member and a rearward cross-member, and wherein the plurality of lower points includes a first lower point proximate the forward cross-member and a second lower point proximate rearward cross-member.

4. A combination as claimed in claim 3, wherein the forward and rearward cross-members are in an area of a passenger cell for the vehicle.

5. A combination as claimed in claim 4, wherein the rearward cross-member is made up of one or more rear axles for the vehicle and support structure therefor.

6. A combination as claimed in claim 1, wherein the each of the first and second rails has a top and the battery pack is mounted to the top of each of the rails at a plurality of upper points that are longitudinally spaced apart.

7. A combination as claimed in claim 1, wherein at each upper point the floor pan has an aperture therethrough that is at least generally aligned with an associated aperture in the battery pack, and further comprising a fastener having a body that is sized to be adjustably positionable in at least one of the apertures longitudinally and laterally, and is fixable in position to fixedly mount battery pack to the floorpan.

8. A combination of a vehicle chassis and a battery pack for a vehicle that is at least partly driven by an electric motor, the combination comprising:
    a vehicle chassis including a first rail and a second rail, wherein the first and second rails extend longitudinally and are spaced apart laterally from each other, wherein each of the rails has a bottom, an inboard side and an outboard side, and wherein the vehicle chassis further includes a floorpan, a forward cross-member and a rearward cross-member; and
    a battery pack, including a plurality of cells supported by a housing, wherein the battery pack is mounted to the bottom of each of the first and second rails at a plurality of lower points that are longitudinally spaced apart including a first lower point proximate the forward cross-member and a second lower point proximate rearward cross-member, wherein the battery pack has a first lateral side and a second lateral side which support the inboard sides of the first and second rails against laterally inwardly directed forces along substantially the entire length of the first and second rails between the forward and rearward cross-members, and wherein the battery pack has a top that is mounted to the floorpan.

9. A combination as claimed in claim 8, wherein the each of the first and second rails has a top and the battery pack is mounted to the top of each of the rails at a plurality of upper points that are longitudinally spaced apart.

10. A combination as claimed in claim 9, wherein at each upper point the floor pan has an aperture therethrough that is at least generally aligned with an associated aperture in the battery pack, and further comprising a fastener having a body that is sized to be adjustably positionable in at least one of the apertures longitudinally and laterally, and is fixable in position to fixedly mount battery pack to the floorpan.

11. A combination of a vehicle chassis and a battery pack for a vehicle that is at least partly driven by an electric traction motor, the combination comprising:
    a vehicle chassis including a first rail, a second rail, and a floorpan, the first and second rails extending longitudinally and being laterally spaced, each of the first and second rails has an inboard side, an outboard side, a bottom portion and a top portion, wherein the floorpan is secured to the top portion of the first and second rails;
    a battery pack including a plurality of cells supported by a housing, the housing configured to include a first lateral side located proximate to the inboard side of the first rail, a second lateral side located proximate to the inboard side of the second rail, a lower housing portion, an upper housing portion, a first lateral extension between the lower housing portion and the first lateral side which extends over the bottom portion of the first rail, and a second lateral extension between the lower housing portion and the second lateral side which extends over the bottom portion of the second rail;
    first fasteners for securely attaching each of the first and second lateral extensions of the battery pack housing to corresponding ones of the bottom portion of the first and second rails; and
    second fasteners for securely attaching the upper housing portion of the battery pack housing to the floorpan.

12. The combination as claimed in claim 11 wherein the vehicle chassis further includes a first cross-member extending between a forward portion of the first and second rails and a second cross-member extending between a rearward portion of the first and second rails, and wherein the battery pack housing further includes a front housing portion located in proximity to the first cross-member and a rear housing portion located in proximity to the second cross-member.

13. The combination as claimed in claim 12 wherein at least one of the front housing portion and the rear housing portion of the battery pack housing is securely attached to the floorpan.

14. The combination as claimed in claim 11 wherein the second fasteners each include a first bracket attached to the upper portion of the housing and extending through a first aperture in the floorpan, a second bracket rigidly secured to the first bracket and engaging the floorpan, and a bolt extending through a second aperture in the floorpan for securely attaching the second bracket to the floorpan.

15. The combination as claimed in claim 14 wherein the bolt extends through an aperture in the top portion of first rail for securing the second bracket to the floorpan and the first rail.

16. The combination as claimed in claim 11 wherein a first plurality of the second fasteners are provided for securing a first part of the upper housing portion located adjacent to the first lateral side to the floorpan, wherein a second plurality of the second fasteners are provided for securing a second part of the upper housing portion located adjacent to the second lateral side to the floorpan.

17. The combination as claimed in claim 16 wherein the first plurality of second fasteners are arranged to secure the floorpan to the first part of the upper housing portion of the battery pack housing and the top portion of the first rail, and wherein the second plurality of second fasteners are arranged to secure the floorpan to the second part of the upper housing portion of the battery pack housing and the top portion of the second rail.

18. The combination as claimed in claim 17 wherein the first and second pluralities of the second fasteners each include a bracket fixedly secured to the upper housing portion of the battery pack housing and a bolt extending through aligned apertures in bracket, the floorpan, and the top portion of the rail.

* * * * *